(12) United States Patent
Weber et al.

(10) Patent No.: US 8,356,451 B2
(45) Date of Patent: Jan. 22, 2013

(54) STRUCTURAL COMPONENT AND METHOD FOR PRODUCING A STRUCTURAL COMPONENT

(75) Inventors: Hans-Juergen Weber, Verden (DE); Gregor Christian Endres, Pfaffenhofen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/302,670

(22) Filed: Nov. 22, 2011

(65) Prior Publication Data
US 2012/0135180 A1 May 31, 2012

Related U.S. Application Data

(63) Continuation of application No. PCT/EP2010/056860, filed on May 19, 2010.

(60) Provisional application No. 61/181,045, filed on May 26, 2009.

(30) Foreign Application Priority Data

May 25, 2009 (DE) .......................... 10 2009 026 458

(51) Int. Cl.
*B29C 70/24* (2006.01)
*E04B 2/00* (2006.01)

(52) U.S. Cl. ............... 52/309.11; 52/790.1; 52/794.1; 29/419.1; 29/897.32; 29/527.1; 428/60; 428/61; 428/223

(58) Field of Classification Search ............... 52/309.7, 52/309.11, 309.16, 586.1, 586.2, 783.1, 790.1, 52/794.1, 745.15, 745.19; 29/897.1, 897.32, 29/897.34, 419.1, 527.2; 244/119, 120, 131; 428/60, 61, 223
See application file for complete search history.

(56) References Cited

U.S. PATENT DOCUMENTS

| 3,331,174 | A | * | 7/1967 | Wesch et al. | 52/309.11 |
| 4,283,896 | A | * | 8/1981 | Fricker et al. | 52/410 |
| 4,350,728 | A | * | 9/1982 | Huang et al. | 428/105 |
| 5,014,476 | A | * | 5/1991 | Leslie et al. | 52/220.2 |
| 5,022,208 | A | * | 6/1991 | Ehrat et al. | 52/586.2 |
| 5,102,723 | A | * | 4/1992 | Pepin | 428/223 |
| 5,398,470 | A | * | 3/1995 | Ritter et al. | 52/309.11 |
| 5,741,574 | A | * | 4/1998 | Boyce et al. | 428/119 |
| 5,869,165 | A | * | 2/1999 | Rorabaugh et al. | 428/105 |

(Continued)

FOREIGN PATENT DOCUMENTS

DE 1951310 A1 4/1970
DE 10018035 A1 10/2001
(Continued)

OTHER PUBLICATIONS

International Search Report for PCT Application No. PCT/EP2010/056860 dated Aug. 16, 2010 (with English Translation).

(Continued)

*Primary Examiner* — Robert Canfield
(74) *Attorney, Agent, or Firm* — Jenkins, Wilson, Taylor & Hunt, P.A.

(57) ABSTRACT

The invention relates to a structural component for an aircraft or spacecraft, comprising a component core extended across a component area, a first and second cover layer, which are formed on two opposite bounding surfaces of the component core and extend across the component area, a plurality of braces, which are distributed across the component area and connect the first and second cover layers to each other through the component core, and a stiffening belt, which extends between the cover layers along a stiffening line that extends substantially parallel to the component area.

14 Claims, 3 Drawing Sheets

U.S. PATENT DOCUMENTS

| | | | |
|---|---|---|---|
| 5,876,652 A * | 3/1999 | Rorabaugh et al. | 264/258 |
| 6,291,049 B1 | 9/2001 | Kunkel et al. | |
| 6,901,713 B2 * | 6/2005 | Axsom | 52/481.1 |
| 6,986,929 B2 * | 1/2006 | Tsotsis | 428/102 |
| 7,485,354 B2 * | 2/2009 | Bohner et al. | 428/60 |
| 7,735,779 B2 * | 6/2010 | Griess et al. | 244/119 |
| 8,127,450 B2 * | 3/2012 | Weber et al. | 29/897.32 |
| 8,128,028 B2 * | 3/2012 | Grillos | 244/119 |
| 2004/0128946 A1 * | 7/2004 | Salmon et al. | 52/782.1 |
| 2007/0210211 A1 | 9/2007 | Grob | |
| 2009/0078820 A1 * | 3/2009 | Lin et al. | 244/1 N |
| 2009/0252917 A1 | 10/2009 | Weber et al. | |

FOREIGN PATENT DOCUMENTS

| | | |
|---|---|---|
| DE | 102005024408 A1 | 11/2006 |
| DE | 102007003274 B3 | 6/2008 |
| EP | 1134069 A1 | 9/2001 |
| EP | 1816070 A2 | 8/2007 |
| GB | 1265835 | 3/1972 |

OTHER PUBLICATIONS

German Office Action for DE 10 2009 026 458.2 dated Jun. 10, 2011.

* cited by examiner

STRUCTURAL COMPONENT AND METHOD FOR PRODUCING A STRUCTURAL COMPONENT

CROSS-REFERENCE TO RELATED APPLICATIONS

This application is a continuation of and claims priority to PCT/EP2010/056860 filed May 19, 2010, which claims the benefit of and priority to U.S. Provisional Application No. 61/181,045, filed May 26, 2009 and German Patent Application No. 10 2009 026 458.2, filed May 25, 2009, the entire disclosures of which are herein incorporated by reference.

FIELD OF THE INVENTION

The present invention relates to a structural component for an aircraft or spacecraft and a method for producing a structural component of this type. The invention further relates to an aircraft or spacecraft comprising a structural component of this type.

Although applicable to any structural components, the present invention and the problem on which it is based will be explained in greater detail with reference to fuselage shells of commercial aircraft.

EP 1134069 discloses the production of structural components for an aircraft in a double-shell construction using sandwich components which comprise a foam core. Structural components of this type, in particular when produced using fibre-reinforced plastics materials, offer a great weight advantage compared with structural components made from conventional materials such as aluminium. However, production and handling of structural components of this type in a double-shell construction for assembly to form larger structures, for example of an aircraft or spacecraft, is extremely time and cost intensive. Furthermore, damage sustained during assembly is expensive to repair.

SUMMARY OF THE INVENTION

An object of the present invention is therefore to enable the reliable and economical application of double-shell structural components.

The idea on which the present invention is based consists in reinforcing a structural component which is extended in a planar manner over a component area and which comprises two face sheets connected via a core enclosed between them, in that a reinforcing belt is provided between the face sheets, which belt stretching along a reinforcement path between the face sheets, which path extends substantially parallel to the component area. Since the reinforcing belt, like the core, extends in the interior between the face sheets, it can be formed by methods used in the production of the sandwich, which offers great cost advantages compared to an assembly using conventional reinforcing elements such as stringers and formers. Since the reinforcing belt extends inside the face sheets, it is furthermore protected from damage between the face sheets.

According to a preferred development, the component core comprises a foam material. This enables cost-effective production of the structural component, as the struts in the foam material are formed as provisionally supporting auxiliary material and connected to the face sheets, wherein the foam material can simply remain inside the component core in a cost-saving manner due to its lightness. Alternatively, the foam can be removed in order to achieve an even lower weight.

According to a preferred development, the struts each comprise a fibre bundle infiltrated with resin. This enables the structural component to be produced economically, as the struts are, for example, formed in the foam material using a simple stitching method and infiltrated with resin in the resulting through holes.

According to a preferred development, the reinforcing belt is formed by a region of increased density of the struts in the component core. This enables extremely low production costs as the reinforcing belt can be produced using methods and devices already used for the insertion of the struts. Furthermore, the struts can be inserted almost without geometric limitations on the course of the reinforcing belt.

According to an alternative preferred development, the reinforcing belt is formed by an insert which extends over the reinforcement path in the component core. In this way, a high level of stability can be achieved. Furthermore, the stable interconnection of face sheets which abut one another along the insert is made possible. Preferably, the insert comprises a tubular fibre braid which surrounds an insert core because this structure is particularly stable and has a low dead weight.

According to a preferred development, at least one strut penetrates the component core and the insert core. In this way, the insert is particularly rigidly connected. The strut preferably extends diagonally to the component area as it is thus easy to insert from the outside.

According to a preferred development, the component area comprises a curvature in at least one direction in space, wherein the reinforcing belt extends helically diagonally to the direction of the curvature. The component can thus advantageously be reinforced against torsional vibrations along the curvature axis.

According to a preferred development, a first and a second reinforcing belt are provided which extend intersecting one another at an angle. The component can thus advantageously be reinforced against deformation in the case of loading in different directions.

According to a preferred development, the reinforcing belt extends in a first and a third portion substantially in a corresponding direction and comprises a split into two annularly connected branches in a portion arranged between the first and third portions. In this way, the reinforcing belt can be guided around planar cut-outs in the structural component, for example window cut-outs, without substantial loss of stability.

In the following, the invention is described in greater detail on the basis of embodiments with reference to the accompanying figures of the drawings.

DESCRIPTION OF EXEMPLARY EMBODIMENTS

Figure 1:
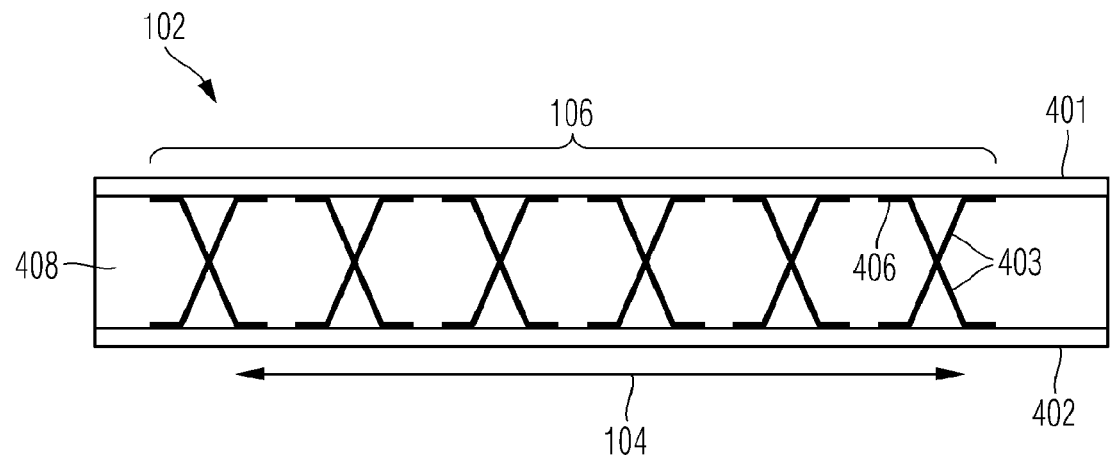
FIG. 1 shows a sectional view of an exemplary structural component according to an embodiment.

In the figures, like reference numerals denote like or functionally identical components, unless indicated otherwise.

FIG. 1 shows a sectional view of a structural component 102 comprising a component core 408 which is made from a foam material and is extended in a planar manner over a component area of the sandwich component, on the opposite, substantially parallel sides of which component core a first 401 and second 402 facing made of a fibre material are formed. The component area extends parallel to the facings 401, 402 and is perpendicular to the plane of projection of FIG. 1. Between the first 401 and second 402 facings, struts 403 made from fibre bundles extend through the component core 408, the ends 406 of which struts rest against the facings 401, 402. Facings 401, 402 and struts 403 are filled with a common polymer matrix.

The struts 403 are distributed over the whole component area of the structural component 102 with a substantially constant minimum areal density. In addition, the areal density of the struts 403 is increased beyond the minimum areal density along an elongate region of a reinforcing belt 106, which extends along a reinforcement path 104 between the face sheets, which path 104 extends substantially parallel to the component area. The structural component 102 thus has an increased rigidity in the region of the reinforcing belt 106.

Figure 2:
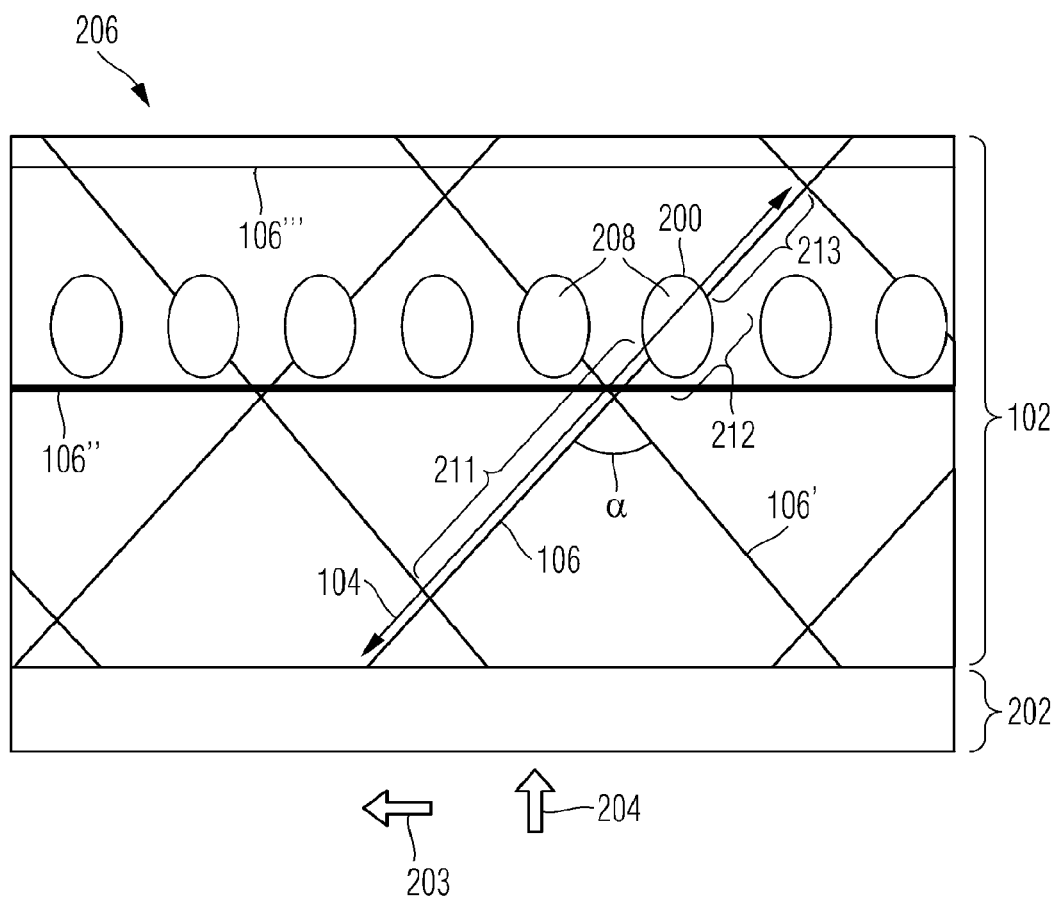
FIG. 2 shows a side view of a fuselage barrel section of an aircraft comprising a structural component according to an embodiment.

FIG. 2 shows a side view of a fuselage barrel section 206 of an aircraft. The fuselage barrel geometry is divided in a longitudinal direction, wherein the upper half of the fuselage barrel is formed by a structural component 102 having a double-shell construction, as shown in FIG. 1. This structural component 102 is produced in one piece, for example using a mould having an inner mould surface, in order to ensure the outer tolerances. The lower half 202 of the fuselage barrel can, for example, be produced in a similar way using metal or another material.

In the structural component 102, reinforcing belts 106, 106', 106'', 106''' formed by the increased areal density of struts 403 extend in a longitudinal direction 203 of the aircraft and in directions which extend oblique to the longitudinal direction of the aircraft and to the curvature direction 204 of the substantially cylindrically curved structural component 102 and which wind helically diagonally around the fuselage barrel section 206. In this case, the diagonally extending reinforcing belts 106, 106' intersect at an angle α of approximately 90°.

In the fuselage barrel section 206 a row of window openings 208 is formed, which openings are surrounded by annular reinforcements 200. The annular reinforcements 200 are included in the course of the reinforcing belts 106, 106', 106'', 106''' in that, for example, a first portion 211 of the reinforcing belt 106 extends in the direction of the diagonal reinforcement path 104, until it abuts an annular reinforcement 200 around a window opening 208. In a second portion 212 in the region of the window opening, the annular reinforcement 200 assumes the function of the reinforcing belt which here divides into two annularly connected branches. On the opposite side of the annular reinforcement 200, these branches meet and the course of the reinforcing belt continues in a third portion 213 in the direction of the reinforcement path 104.

The reinforcement design shown is only an example and can be fully adjusted to local loading (load introductions, cut-outs). Geometric variations in the foam (variations in thickness, curvatures, ramps) can further be included in the reinforcement design.

Figure 3:
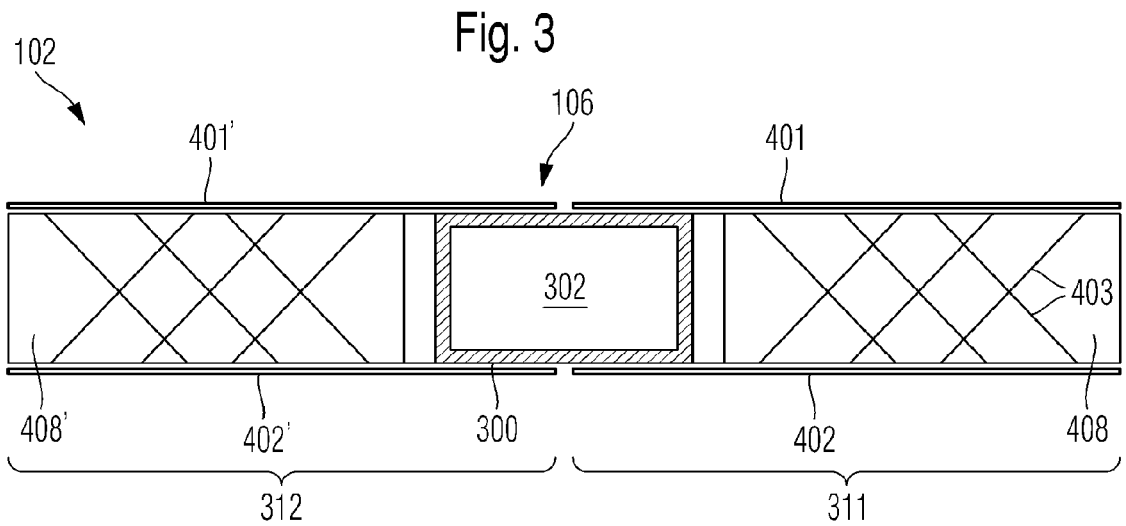
FIG. 3 shows a schematic sectional view of a structural component comprising a lining, according to an embodiment.

FIG. 3 shows a schematic sectional view of a further structural component 102 which is assembled from a first component half 311 comprising a foam core 408 and face sheets 401, 402, and a second component half 312 comprising a foam core 408' and face sheets 401, 402, along a joint line which extends in the centre of FIG. 3 perpendicular to the plane of projection. Along the joint line an insert 302, 300 is inserted between the face sheets 401, 401' and 402, 402', which insert comprises an insert core 302 made from foam material, and a sheathing 300 made from tubular fibre braid. The sheathing 300 is, for example, infiltrated with resin, together with the face sheets 401, 401', 402, 402' and the struts 403. The insert functions as a reinforcing belt 106 by means of the sheathing.

Figure 4:
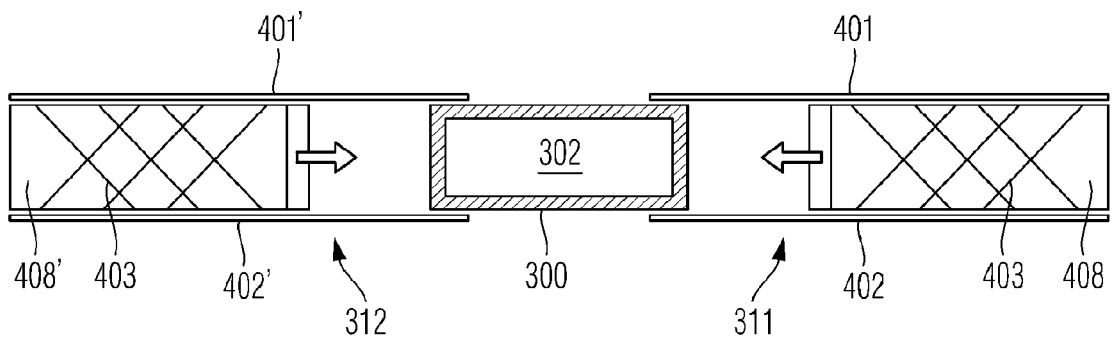
FIG. 4 shows a representation of a production method according to an embodiment for the structural component shown in FIG. 3.
Figure 5:
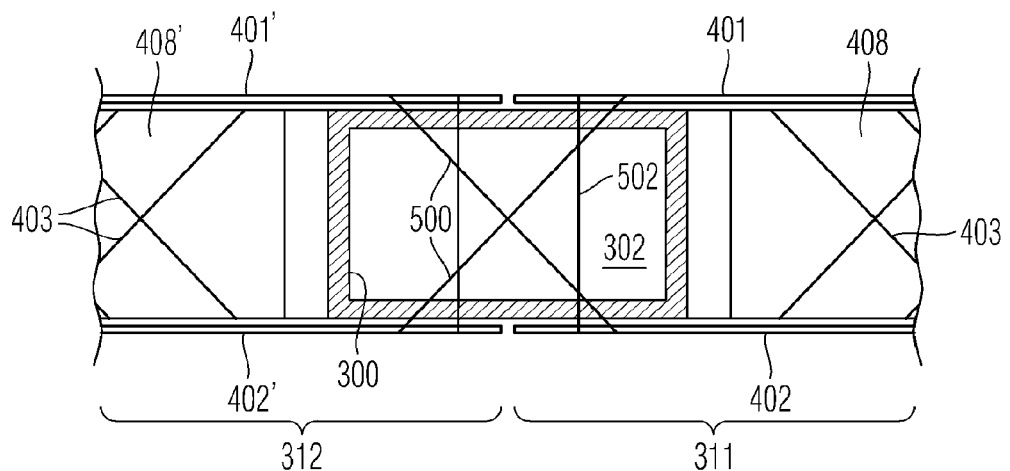
FIG. 5 shows a schematic sectional view of a structural component comprising an insert, according to a further embodiment.

FIG. 4 schematically shows a possible production method for the structural component of FIG. 3, wherein part of the respective core 408, 408' is removed from the two component halves 311, 312 and the insert 300, 302 is inserted in lieu thereof. The integration of the insert can be further reinforced via the insertion of additional struts 500, 502 which penetrate the face sheets 401, 401', 402, 402' and the sheathing 300 of the insert 300, 302.

Figure 6:
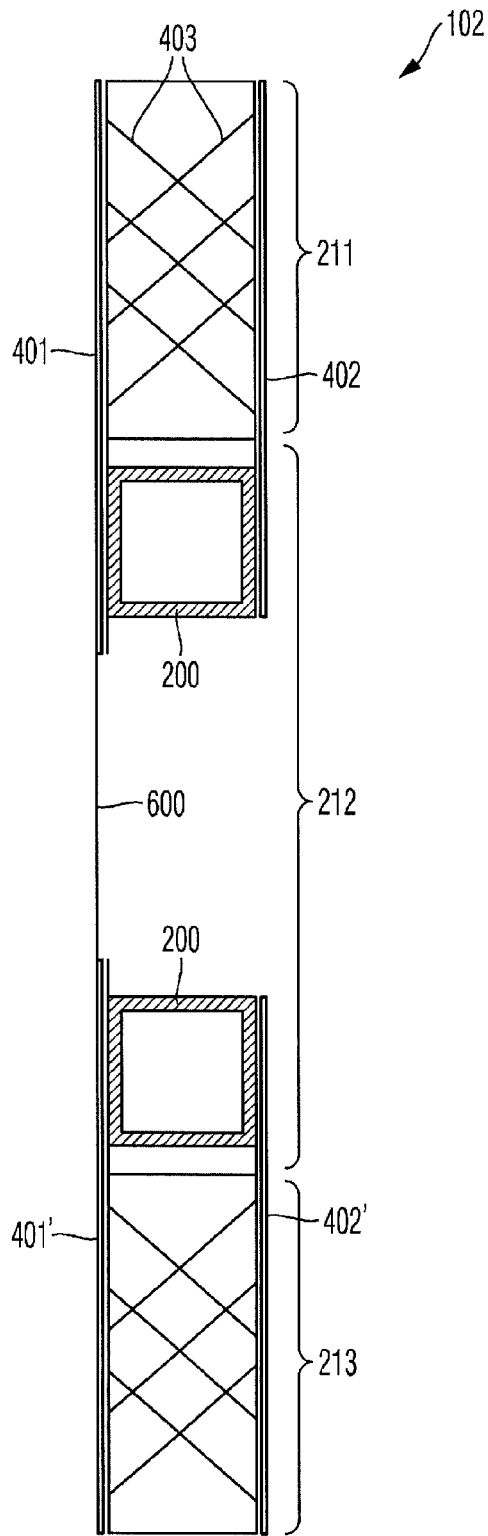
FIG. 6 shows a schematic sectional view of a structural component comprising a window opening, according to an embodiment.

FIG. 6 shows a schematic sectional view of a structural component 102 comprising an opening for a window 600, wherein a reinforcement belt consisting of three portions 211, 212, 213 as described with reference to FIG. 2 extends over the window opening. The annular insert 200 is, for example, constructed in the same way as the insert 300, 302 in FIG. 3.

Figure 7:
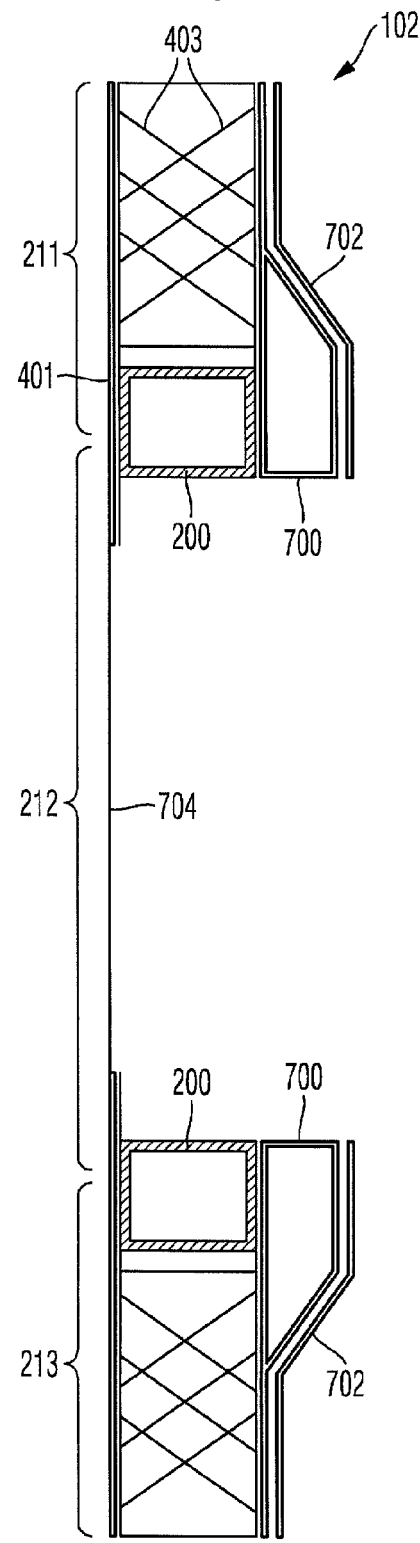
FIG. 7 shows a schematic sectional view of a structural component comprising a door opening, according to an embodiment.

FIG. 7 shows a schematic sectional view of a structural component 102 comprising an opening for a door 704. As additional reinforcement, supports 700 and a further facing 702 are fitted on the inner face of the aircraft fuselage.

Although the present invention has presently been described on the basis of preferred embodiments, it is not restricted thereto, but can be modified in many different ways.

For example, further structural components of an aircraft such as aerofoils or tail units can be constructed in the manner described.

In the following preferred embodiments of the structural component, the fuselage cell, the aircraft or spacecraft and the method are explained.

1. A structural component for an aircraft or spacecraft, comprising:
a component core extended over a component area;
a first and second face sheet which are formed extending over the component area on two opposite boundary faces of the component core;
a plurality of struts distributed over the component area, which struts connect the is first and second face sheets to one another via the component core; and
a reinforcing belt which extends along a reinforcement path between the face sheets, said path extending substantially parallel to the component area.

2. The structural component according to embodiment 1, wherein the component core comprises a foam material.

3. The structural component according to embodiment 1, wherein the struts each comprise a fibre bundle infiltrated with resin.

4. The structural component according to embodiment 1, wherein the reinforcing belt is formed by means of a region of increased density of the struts in the component core.

5. The structural component according to embodiment 1, wherein the reinforcing belt is formed by means of an insert in the component core, which insert extends over the reinforcement path.

6. The structural component according to embodiment 5, wherein the insert comprises a tubular fibre braid which surrounds an insert core.

7. The structural component according to embodiment 5, wherein at least one strut, in particular a strut extending diagonally, penetrates at least one face sheet and the insert.

8. The structural component according to embodiment 1, wherein the component area comprises a curvature in at least a curvature direction, the reinforcing belt extending helically diagonally in the curvature direction.

9. The structural component according to embodiment 1 wherein a first and a second reinforcing belt which extend intersecting one another at an angle (a) are provided.

10. The structural component according to embodiment, wherein the reinforcing belt extends in a first and a third portion substantially in the direction of the reinforcement path and comprises a split into two annularly connected branches in a second portion arranged between the first and third portions.

11. A fuselage shell for an aircraft or spacecraft comprising a structural component according to any one of claims 1 to 10.

12. An aircraft or spacecraft comprising a fuselage shell according to embodiment 11 or a structural component according to embodiment 1.

13. A method for producing a structural component for an aircraft or spacecraft, comprising the following steps:
preparation of a component core which is expanded over a component area and comprises a foam material;
arrangement of a first and second face sheet on two opposite boundary faces of the component core, which face sheets extend over the component area;
formation of a plurality of struts distributed over the component area, which struts connect the first and second face sheet to one another via the component core; and
insertion of a reinforcing belt which extends along a reinforcement path between the face sheets, which reinforcement path extends substantially parallel to the component area.

14. The method according to embodiment 13, wherein the insertion of the reinforcing belt results from the formation of the struts in an increased areal density.

15. The method according to embodiment 13 wherein a step of at least partial removal of the foam material is provided.

LIST OF REFERENCE NUMERALS

| | |
|---|---|
| 102 | structural component |
| 104 | reinforcement path |
| 106 | reinforcing belt |
| 200 | ring structure |
| 202 | lower shell |
| 203 | longitudinal direction of aircraft |
| 204 | direction of curvature |
| 206 | fuselage barrel section |
| 211-213 | belt portions |
| 300 | tube braid |
| 302 | insert core |
| 311, 312 | component halves |
| 401, 402 | facing |
| 403 | strut |
| 406 | anchor |
| 408 | component core |
| 500, 502 | additional struts |
| 600 | window |
| 500 | vertical strut |

-continued

LIST OF REFERENCE NUMERALS

| | |
|---|---|
| 502 | diagonal strut |
| 700 | support |
| 702 | further facing |
| 704 | door |

The invention claimed is:

1. A structural component for an aircraft or spacecraft, comprising:
a component core extended over a component area;
a first and second face sheet which are formed extending over the component area on two opposite boundary faces of the component core;
a reinforcing belt which is formed by means of an insert in the component core, which insert extends along a reinforcement path between the face sheets, said reinforcement path extending substantially parallel to the component area, and comprises an insert core and a tubular fibre braid surrounding the insert core; and
a plurality of struts distributed over the component area, which struts connect the first and second face sheet to one another via the component core, wherein at least one of the struts penetrates at least one face sheet and the tubular fibre braid.

2. The structural component according to claim 1, wherein the component core and/or the insert core comprises a foam material.

3. The structural component according to claim 1, wherein the struts each comprise a fibre bundle infiltrated with resin.

4. The structural component according to claim 1, wherein the at least one strut penetrates the insert.

5. The structural component according to claim 4, wherein the at least one strut extends diagonally to the component area.

6. The structural component according to claim 1 wherein the face sheets, the tubular fibre braid and the struts are together infiltrated with resin.

7. The structural component according to claim 1, wherein the component area comprises a curvature in at least one curvature direction, the reinforcing belt extending helically diagonally to the curvature direction.

8. The structural component according to claim 1, wherein a first and a second reinforcing belt which extend intersecting one another at an angle ($\alpha$) are provided.

9. The structural component according to claim 1, wherein the reinforcing belt in a first and a third portion extends substantially in the direction of the reinforcement path and comprises a split into two annularly connected branches in a second portion arranged between the first and third portions.

10. A fuselage shell for an aircraft or spacecraft comprising a structural component according to claim 1.

11. An aircraft or spacecraft comprising a fuselage shell according to claim 10 or a structural component according to claim 1.

12. A method for producing a structural component for an aircraft or spacecraft, comprising the following steps:
preparation of a component core which is extended over a component area and comprises a foam material;
arrangement of a first and second face sheet on two opposite boundary faces of the component core, which face sheets extend over the component area;
insertion of a reinforcing belt which is formed by an insert in the component core, which insert extends along a reinforcement path between the face sheets, said reinforcement path extending substantially parallel to the component area, and comprises an insert core and a tubular fibre braid surrounding the insert core; and formation of a plurality of struts distributed over the component area, which struts connect the first and second face sheet to one another via the component core in such a way that at least one of the struts penetrates at least one face sheet and the tubular fibre braid.

13. The method according to claim 12, wherein joint infiltration with resin of the face sheets, the tubular fibre braid and the struts is done.

14. The method according to claim 12, wherein a step of at least partial removal of the foam material is done.

* * * * *